(12) United States Patent
Kim et al.

(10) Patent No.: US 8,037,767 B2
(45) Date of Patent: Oct. 18, 2011

(54) TRANSMIT APODIZATION USING A SINC FUNCTION IN AN ULTRASOUND SYSTEM

(75) Inventors: Jin Kim, Seoul (KR); Hong Gyo Lee, Seoul (KR); Ra Young Yoon, Seoul (KR); Ronald E. Daigle, Redmond, WA (US)

(73) Assignee: Medison Co., Ltd., Kangwon-do (KR)

( * ) Notice: Subject to any disclaimer, the term of this patent is extended or adjusted under 35 U.S.C. 154(b) by 349 days.

(21) Appl. No.: 12/277,205

(22) Filed: Nov. 24, 2008

(65) Prior Publication Data

US 2009/0137903 A1 May 28, 2009

(30) Foreign Application Priority Data

Nov. 23, 2007 (KR) .................. 10-2007-0120354

(51) Int. Cl.
*G01N 29/00* (2006.01)
*A61B 8/00* (2006.01)
(52) U.S. Cl. ............... 73/649; 73/596; 73/627; 600/437
(58) Field of Classification Search .............. 73/649, 73/596, 597, 620, 627; 600/437, 443
See application file for complete search history.

(56) References Cited

U.S. PATENT DOCUMENTS

| 5,235,982 | A  | * | 8/1993 | O'Donnell ................. 600/443 |
| 6,193,659 | B1 |   | 2/2001 | Ramamurthy et al. |
| 7,426,443 | B2 | * | 9/2008 | Simon .......................... 702/48 |
| 7,542,790 | B2 | * | 6/2009 | Jensen et al. ............... 600/407 |
| 2005/0111846 | A1 |   | 5/2005 | Steinbacher et al. |
| 2007/0038091 | A1 | * | 2/2007 | Shiki .......................... 600/437 |
| 2009/0141957 | A1 | * | 6/2009 | Yen et al. ..................... 382/131 |
| 2010/0049042 | A1 | * | 2/2010 | Azuma ........................ 600/437 |

FOREIGN PATENT DOCUMENTS

| JP | 2005-103290 | 4/2005 |
| JP | 2005-152628 | 6/2005 |

OTHER PUBLICATIONS

Kwang-Ju Lee et al., "An Experimental Study of the Synthetic Sine Wave in Ultrasonic Imaging," J. Biomed. Eng. Res., vol. 23, No. 3, pp. 243-251, 2002.
Korean Office Action issued in Korean Patent Application No. KR 10-2007-0120354 dated Dec. 13, 2010.

* cited by examiner

*Primary Examiner* — J M Saint Surin
(74) *Attorney, Agent, or Firm* — McDermott Will & Emery LLP (57) ABSTRACT

The present invention relates to transmit apodization using a sinc function in an ultrasound system. The ultrasound system includes: a transmission unit operable to generate transmit pulse signals with transmit apodization applied by using a sinc function; a probe operable to generate ultrasound signals based on the transmit pulse signals to thereby form a transmit beam and transmit the transmit beam along a predetermined scan line among a plurality of scan lines in a target object, the probe being further operable to receive ultrasound echoes reflected from the target object; and a reception unit operable to form receive signals corresponding to a plurality of scan lines based on the ultrasound echoes.

3 Claims, 7 Drawing Sheets

TRANSMIT APODIZATION USING A SINC FUNCTION IN AN ULTRASOUND SYSTEM

The present application claims priority from Korean Patent Application No. 10-2007-0120354 filed on Nov. 23, 2007, the entire subject matter of which is incorporated herein by reference.

BACKGROUND OF THE INVENTION

1. Technical Field

The present invention generally relates to ultrasound systems, and more particularly to transmit apodization using a sinc function in an ultrasound system.

2. Background Art

An ultrasound system has become an important and popular diagnostic tool since it has a wide range of applications. Specifically, due to its non-invasive and non-destructive nature, the ultrasound has been extensively used in the medical profession. Modern high-performance ultrasound diagnostic systems and techniques are commonly used to produce two or three-dimensional diagnostic images of internal features of an object (e.g., human organs).

Generally, the ultrasound system may transmit an ultrasound beam formed with a set of ultrasound signals to a target object and receive ultrasound echoes reflected from the target object. The ultrasound system may form ultrasound images based on the received ultrasound echoes. When operated to form the ultrasound images, a frame rate is very important for diagnosing the target object (especially moving objects) in real time. The frame rate may be in inverse proportion to the number of transmission times of the transmit beam for obtaining one frame. That is, if the transmit beam is transmitted at a relatively less number of transmission times, then the frame rate may become high, However, distortion of the ultrasound image may occur due to a low amount of data.

DETAILED DESCRIPTION OF THE INVENTION

Figure 1:
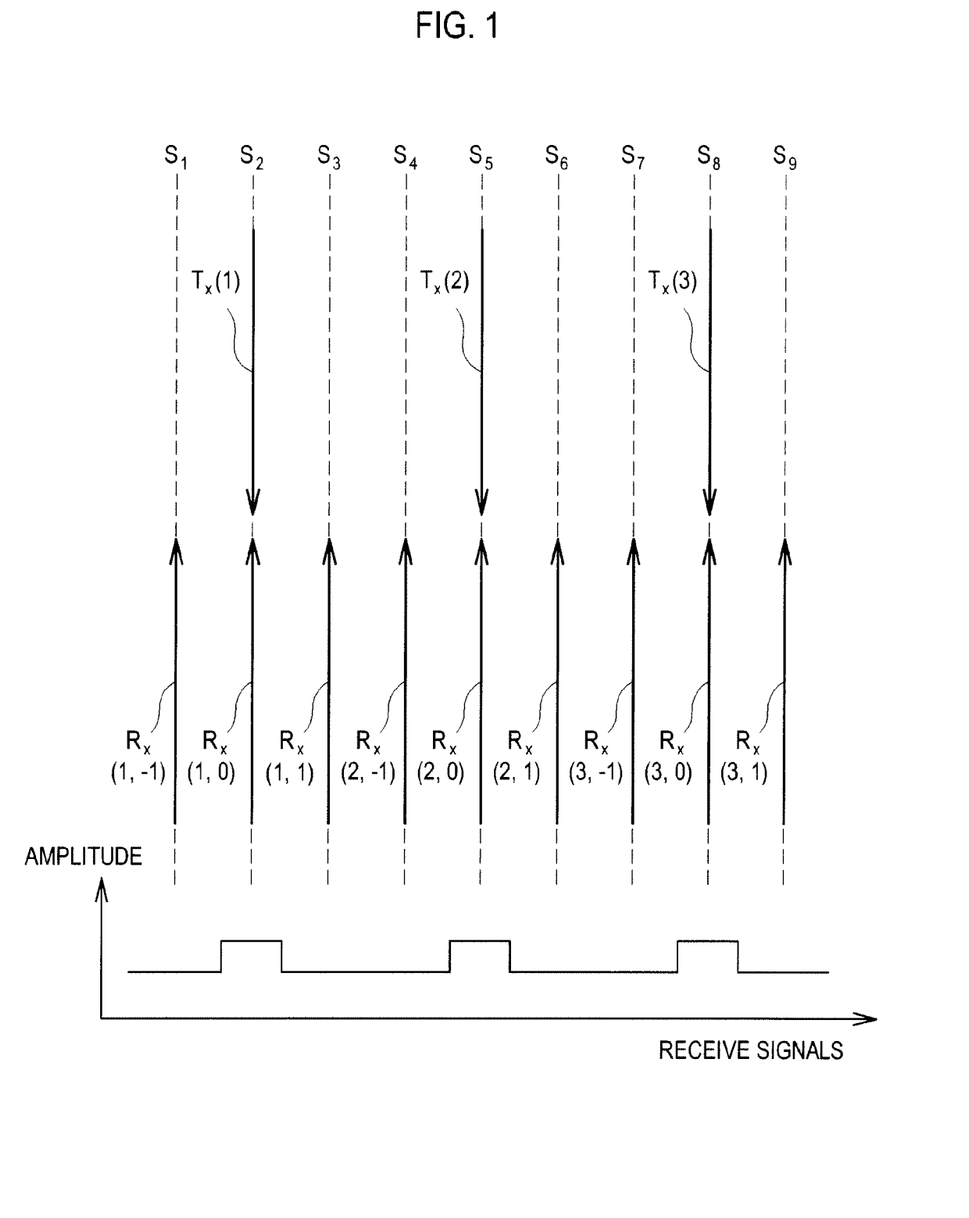
FIG. 1 is a schematic diagram showing an example of obtaining receive signals by using multi-beam receive focusing.

Multi-beam receive focusing has been introduced to increase the frame rate without distorting the ultrasound image. The multi-beam receive focusing may be carried out to form multi-receive beams corresponding to a plurality of scan lines per transmission of the transmit beam. FIG. 1 is a schematic diagram showing an example of obtaining receive signals by using multi-beam receive focusing. Referring to FIG. 1, the ultrasound system may generate ultrasound signals based on transmit pulse signals to thereby form a transmit beam Tx(1). Further, the ultrasound system may transmit the transmit beam Tx(1) along a scan line $S_2$ in a target object. The ultrasound system may receive ultrasound echoes reflected from the target object and then form three receive beams Rx(1, −1), Rx(1, 0) and Rx(1, 1), which correspond to scan lines $S_1$, $S_2$ and $S_3$ based on the received ultrasound echoes. Thereafter, in the same manner, three receive beams Rx(2, −1), Rx(2, 0) and Rx(2, 1) corresponding to the scan lines $S_4$, $S_5$ and $S_6$ may be formed in response to the transmission of a transmit beam Tx(2) along the scan line $S_5$. Subsequently, three receive beams Rx(3, −1), Rx(3, 0) and Rx(3, 1) corresponding to the scan lines $S_7$, $S_8$ and $S_9$ may also be formed in response to the transmission of a transmit beam Tx(3) along the scan line $S_8$. As such, the receive signals corresponding to the three scan lines may be formed in response to one transmission of the transmit beam so that the frame rate may be increased.

In such a case, however, intensities of the receive signals corresponding to the scan lines $S_2$, $S_5$ and $S_8$ may be higher than those of the receive signals corresponding to the scan lines $S_1$, $S_3$, $S_4$, $S_6$, $S_7$ and $S_9$. Thus, a multi-beam artifact due to intensity changes of the receive signals may be generated in the ultrasound images.

Figure 2:
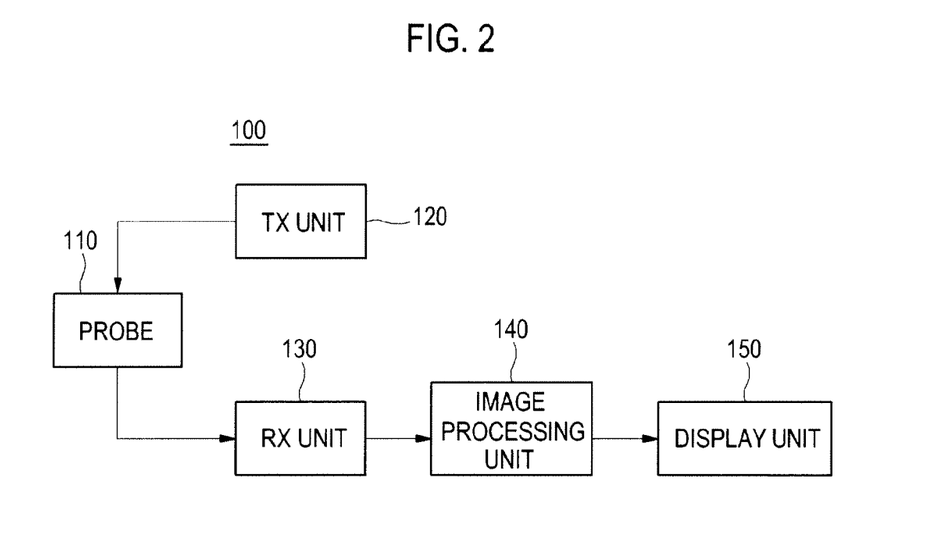
FIG. 2 is a block diagram showing an illustrative embodiment of an ultrasound system.
Figure 3:
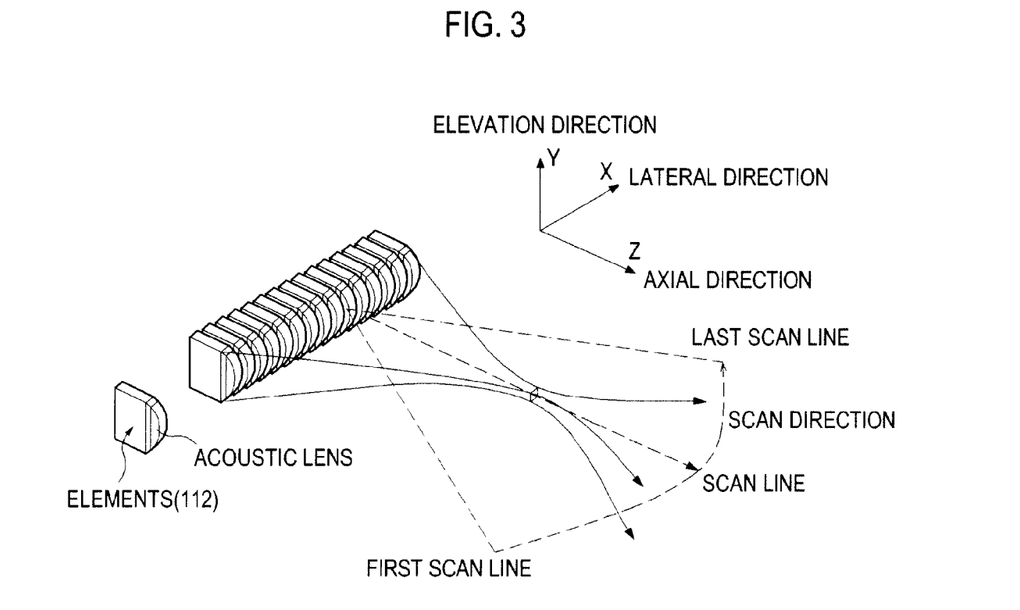
FIG. 3 is a schematic diagram showing an example of a transmit beam formed with a set of ultrasound signals generated from a plurality of transducer elements.

FIG. 2 is a block diagram showing an illustrative embodiment of an ultrasound system. A probe 110 may include a plurality of transducer elements 112. Each of the transducer elements 112 may be configured to reciprocally convert ultrasound signals into electrical signals and vice-versa. As illustrated in FIG. 3, the transducer elements 112 may generate ultrasound signals to thereby form an ultrasound transmit beam. The ultrasound transmit beam may be transmitted to a target object in an axial direction. The transducer elements 112 may receive ultrasound echoes reflected from the target object.

A transmission unit 120 may be configured to generate transmit pulse signals with transmit apodization applied. In one embodiment, a sinc function may be used as a transmit apodization function for the transmit apodization. The generated transmit pulse signals are applied to the transducer elements 112. Further, the transmission unit 120 may apply delays to the transmit pulse signals for the respective transducer elements depending on the desired focal location of the transmit beam.

Figure 4:
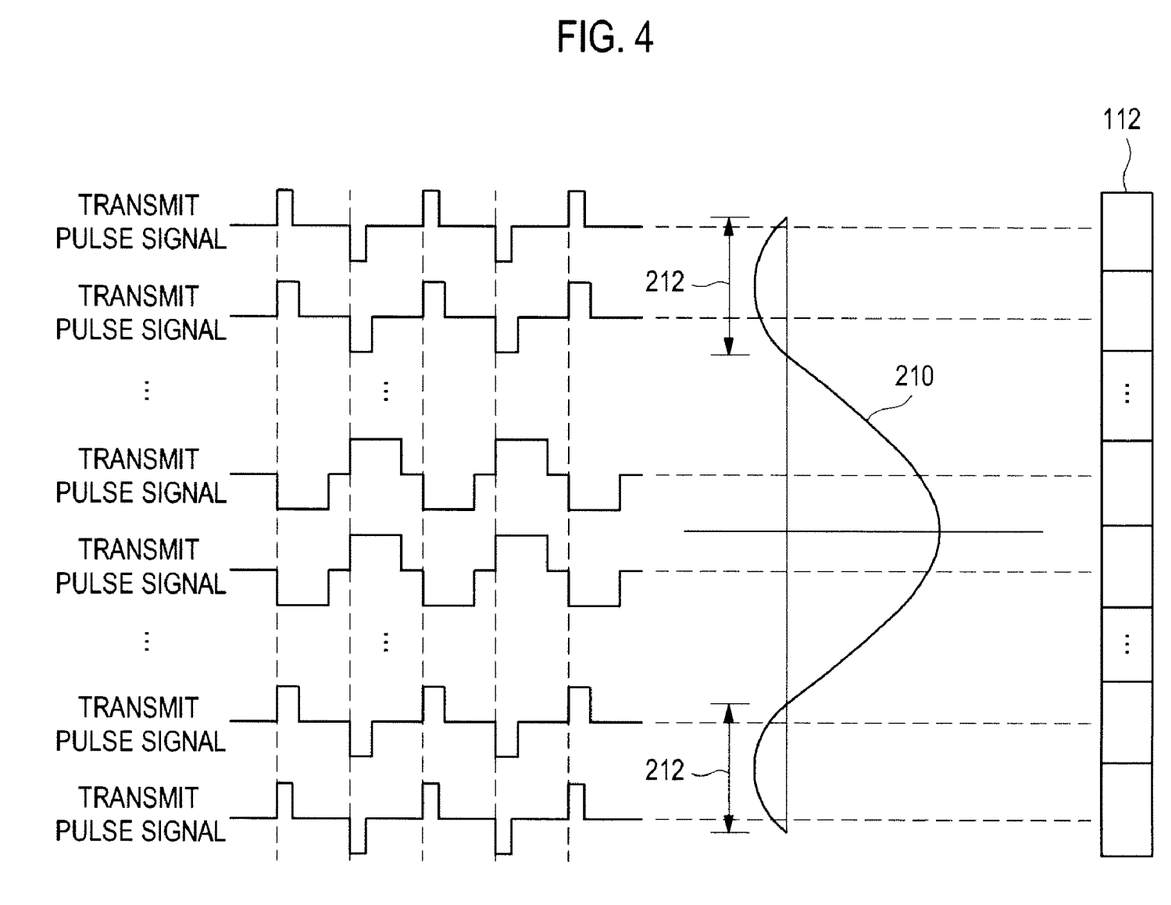
FIG. 4 is a schematic diagram showing examples of a sinc function, transducer elements and transmit pulse signals in one embodiment.

FIG. 4 is a schematic diagram showing examples of a sinc function, transducer elements and transmit pulse signals in one embodiment. As shown in FIG. 4, the transmission unit 120 may be configured to generate the transmit pulse signals with weighting values for adjusting phases and widths, i.e., apodization coefficients applied based on the sinc function 210 for the respective transducer elements 112. The sinc function 210 may have minus values. Thus, the weighting values may include first weighting values for phase-shifting the transmit pulse signals applied to transducer elements corresponding to the minus values by 180°. Also, the weighting values may include second weighting values for adjusting widths of the transmit pulse signals based on absolute values of the sinc function 210 corresponding to positions of the respective transducer elements.

Figure 5:
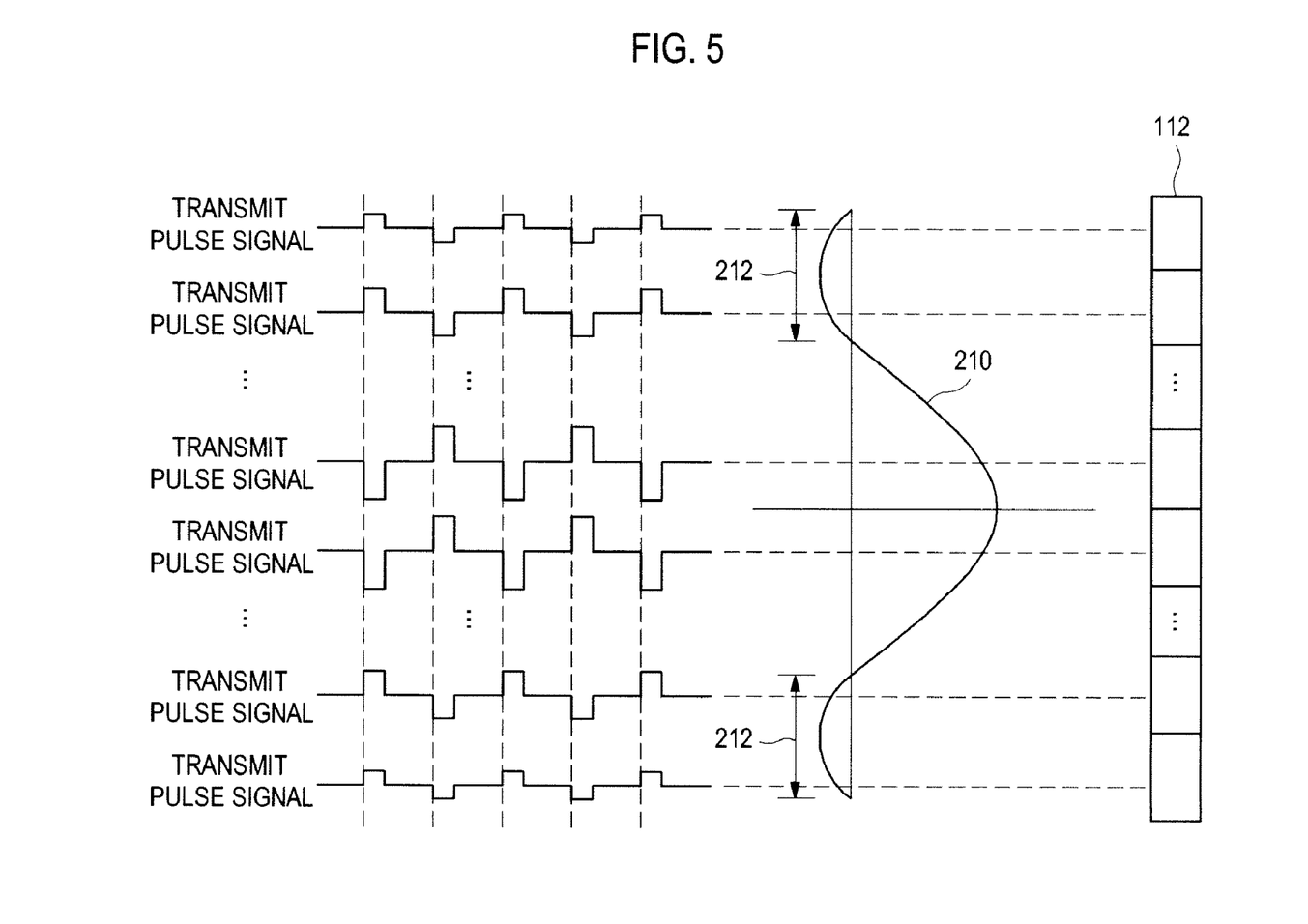
FIG. 5 is a schematic diagram showing examples of a sinc function, transducer elements and transmit pulse signals in another embodiment.

FIG. 5 is a schematic diagram showing examples of a sinc function, transducer elements and transmit pulse signals in another embodiment. The transmission unit 120 may be configured to generate the transmit pulse signals with weighting values for adjusting phases and amplitudes, i.e., apodization coefficients applied based on the sinc function 210 for the respective transducer elements 112. The weighting values may include the first weighting values for phase-shifting the transmit pulse signals applied to transducer elements corresponding to the minus values of the sinc function by 180°. Further, the weighting values may include third weighting values for adjusting amplitudes of the transmit pulse signals based on absolute values of the sinc function 210 corresponding to positions of the respective transducer elements.

Figure 6:
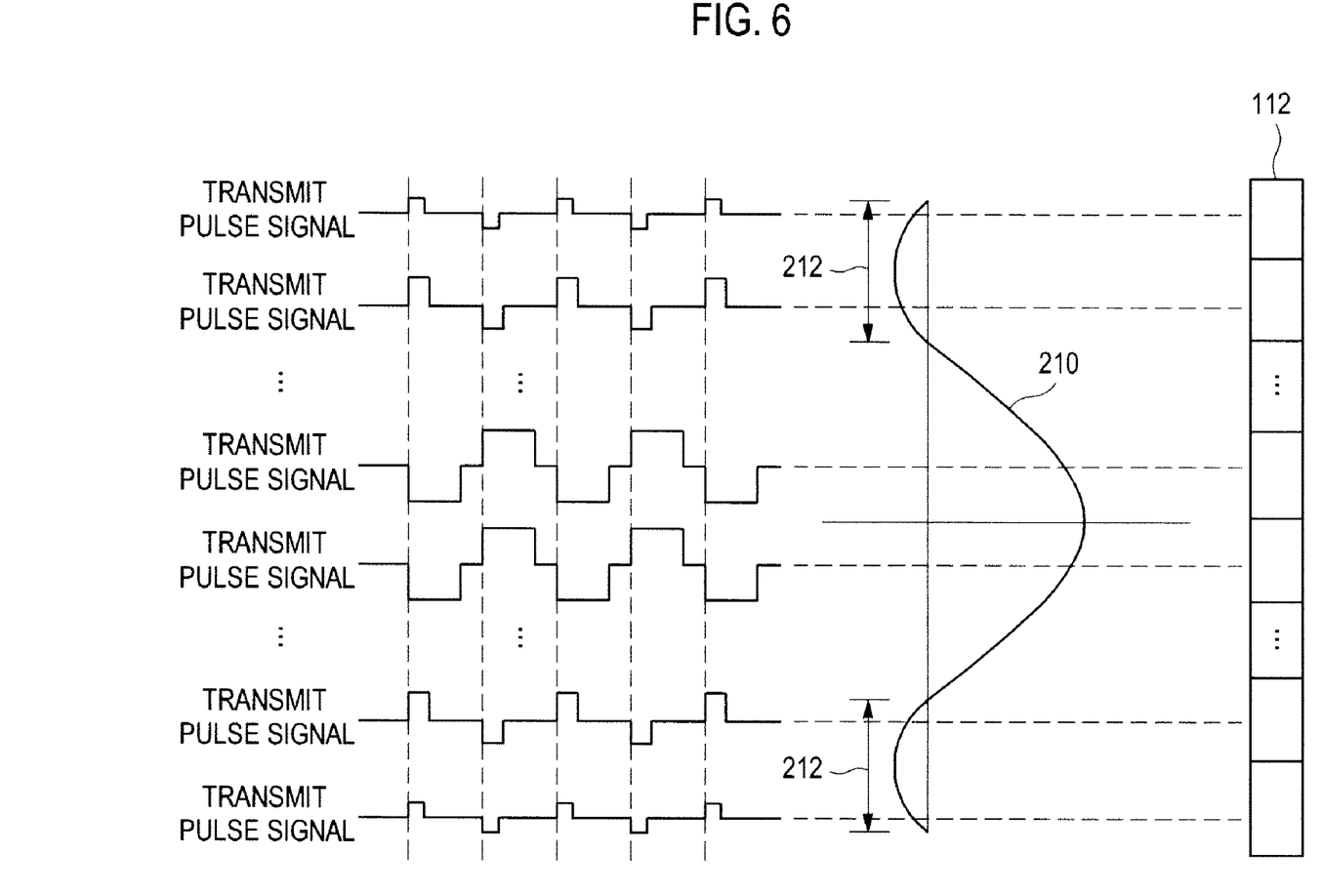
FIG. 6 is a schematic diagram showing examples of a sinc function, transducer elements and transmit pulse signals in yet another embodiment.

FIG. 6 is a schematic diagram showing examples of a sinc function, transducer elements and transmit pulse signals in yet another embodiment. The transmission unit 120 may be configured to generate the transmit pulse signals with weighting values for adjusting phases, widths and amplitudes, i.e., apodization coefficients applied based on the sinc function 210 for the respective transducer elements 112. The weighting values may include the first weighting values for phase-shifting the transmit pulse signals applied to transducer elements corresponding to the minus values of the sinc function 210 by 180°. Further, the weighting values may include second and third weighting values for adjusting widths and amplitudes of the transmit pulse signals based on absolute values of the sinc function 210 corresponding to positions of the respective transducer elements.

Figure 7:
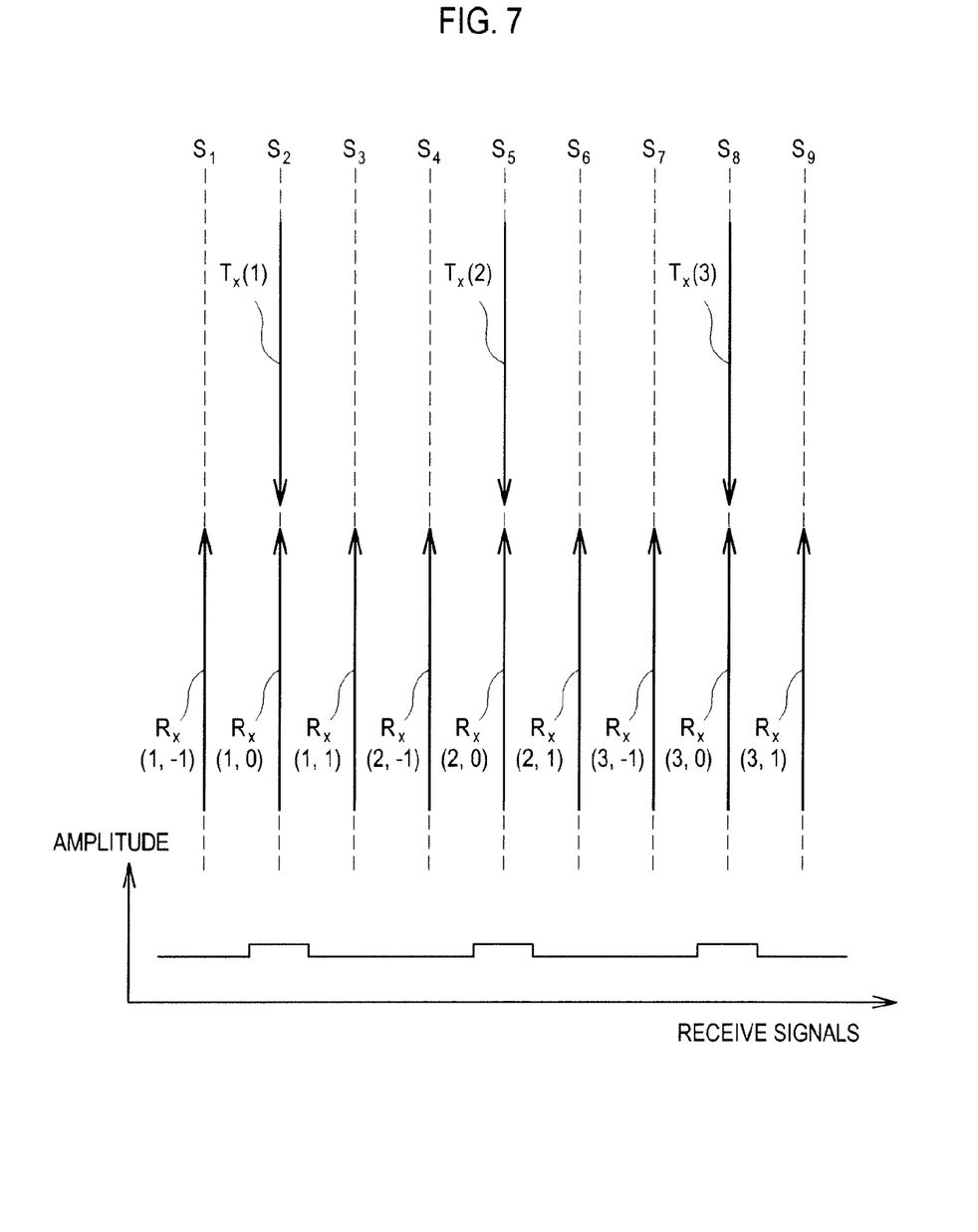
FIG. 7 is a schematic diagram showing an example of forming multi-receive beams in one embodiment.
Figure 8:
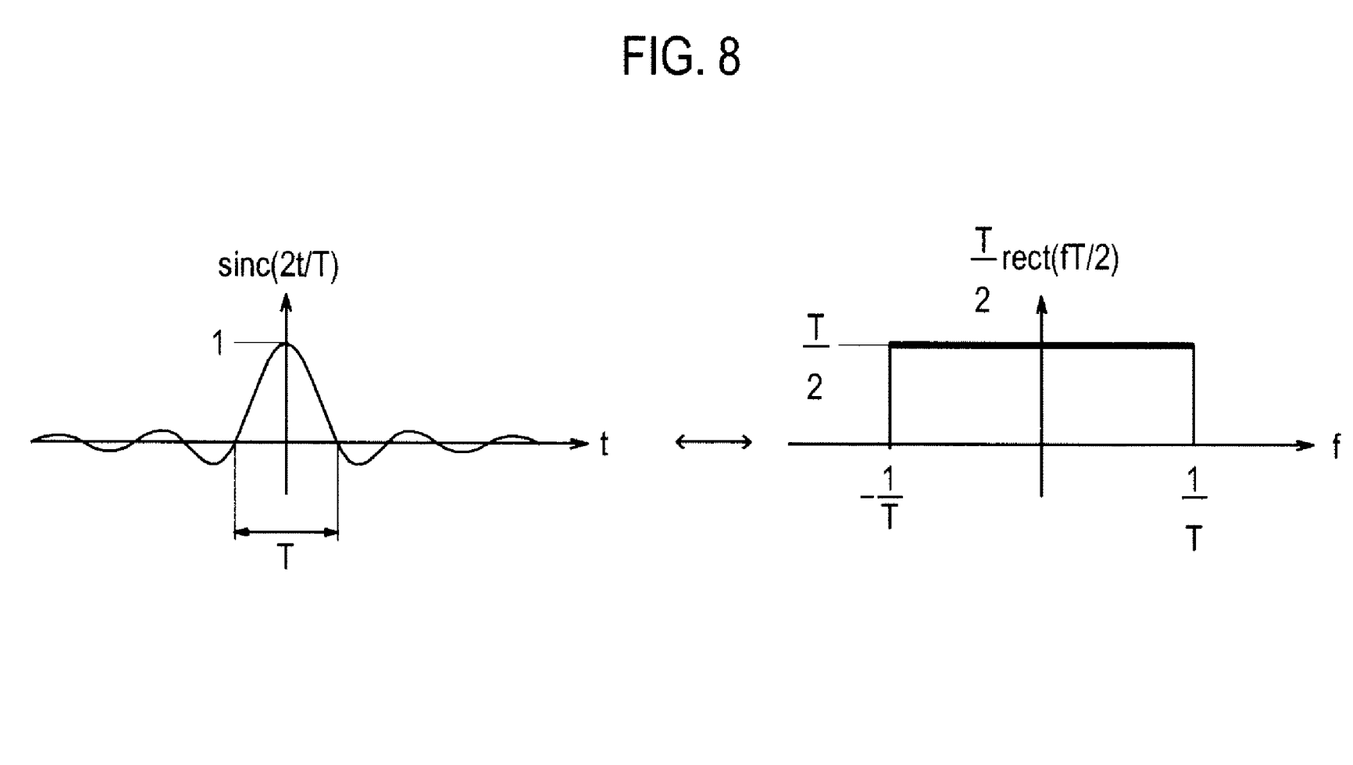
FIG. 8 is a schematic diagram showing examples of a sinc function and a rectangle function obtained by Fourier transformation of the sinc function.

A reception unit 130 may be configured to form receive signals corresponding to the scan lines based on the ultrasound echoes received at the probe. FIG. 7 is a schematic diagram showing an example of forming multi-receive beams in one embodiment. If the transmit beams Tx(1), Tx(2), Tx(3) . . . are sequentially transmitted along scan lines $S_2$, $S_5$, $S_8$, . . . from the probe 110, the reception unit 130 may form the receive signals Rx(1, −1), Rx(1, 0), Rx(1, 1), Rx(2, −1) . . . in response to the transmit beams Tx(1), Tx(2), Tx(3) . . . . In such a case, intensities of the receive signals may be similar to each other, as shown in FIG. 7. The transmit beam may have a characteristic corresponding to the Fourier transformed transmit apodization function at a far field due to a characteristic of an acoustic field. As the sinc function is used as the transmit apodization function, a characteristic of a rectangle function corresponding to the Fourier transformed sinc function may occur as shown in FIG. 8. That is, a profile of the transmit beam may be widened by using the sinc function as the apodization function such that the transmit beam may cover the scan lines neighboring the transmit scan line. Thus, the receive signals having similar intensities may be obtained as shown in FIG. 7.

An image processing unit 140 may be configured to form an ultrasound image of the target object based on the receive signals corresponding to the respective scan lines.

As mentioned above, the sinc function is used as the apodization function in one embodiment and the intensities of the receive signals may become similar to each other. Thus, an ultrasound image with the multi-beam artifacts reduced may be provided.

In accordance with one embodiment of the present invention, there is provided an ultrasound system, comprising: a transmission unit configured to generate transmit pulse signals with transmit apodization applied by using a sinc function; a probe configured to generate ultrasound signals based on the transmit pulse signals to thereby form a transmit beam and transmit the transmit beam along a predetermined scan line among a plurality of scan lines in a target object, said probe being further configured to receive ultrasound echoes reflected from the target object; and a reception unit configured to form receive signals corresponding to a plurality of scan lines based on the ultrasound echoes.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
a transmission unit configured to generate transmit pulse signals and apply weighting values based on a sine function for transmit apodization to phase-shift transmit pulse signals corresponding to minus values of the sine function by 180° and adjust widths of the transmit pulse signals according to absolute values of the sine function;
a probe configured to generate ultrasound signals based on the transmit pulse signals to thereby form a transmit beam and transmit the transmit beam along a predetermined scan line among a plurality of scan lines in a target object, the probe being further configured to receive ultrasound echoes reflected from the target object; and
a reception unit configured to form receive signals corresponding to a plurality of scan lines based on the ultrasound echoes.

2. An ultrasound system, comprising:
a transmission unit configured to generate transmit pulse signals and apply weighting values based on a sinc function for transmit apodization to phase-shift transmit pulse signals corresponding to minus values of the sinc function by 180° and adjust amplitudes of the transmit pulse signals according to absolute values of the sinc function;
a probe configured to generate ultrasound signals based on the transmit pulse signals to thereby form a transmit beam and transmit the transmit beam along a predetermined scan line among a plurality of scan lines in a target object, the probe being further configured to receive ultrasound echoes reflected from the target object; and
a reception unit configured to form receive signals corresponding to a plurality of scan lines based on the ultrasound echoes.

3. An ultrasound system, comprising:
a transmission unit configured to generate transmit pulse signals and apply weighting values based on a sinc function for transmit apodization to phase-shift transmit pulse signals corresponding to minus values of the sinc function by 180° and adjust widths and amplitudes of the transmit pulse signals according to absolute values of the sinc function;

a probe configured to generate ultrasound signals based on the transmit pulse signals to thereby form a transmit beam and transmit the transmit beam along a predetermined scan line among a plurality of scan lines in a target object, the probe being further configured to receive ultrasound echoes reflected from the target object; and a reception unit configured to form receive signals corresponding to a plurality of scan lines based on the ultrasound echoes.

* * * * *